US010065495B2

(12) United States Patent
Salzberger et al.

(10) Patent No.: US 10,065,495 B2
(45) Date of Patent: Sep. 4, 2018

(54) FILLER NECK FOR A FUEL TANK OF A MOTOR VEHICLE

(75) Inventors: Thomas Salzberger, Mallersdorf (DE); Michal Sedlak, Mallersdorf (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 238 days.

(21) Appl. No.: 13/824,945

(22) PCT Filed: Aug. 29, 2011

(86) PCT No.: PCT/EP2011/004330
§ 371 (c)(1),
(2), (4) Date: Mar. 18, 2013

(87) PCT Pub. No.: WO2012/034643
PCT Pub. Date: Mar. 22, 2012

(65) Prior Publication Data
US 2013/0186894 A1 Jul. 25, 2013

(30) Foreign Application Priority Data
Sep. 16, 2010 (DE) .................. 10 2010 045 475

(51) Int. Cl.
*B60K 15/04* (2006.01)
(52) U.S. Cl.
CPC ........ *B60K 15/04* (2013.01); *B60K 2015/048* (2013.01); *B60K 2015/0451* (2013.01)
(58) Field of Classification Search
CPC .................................. F02M 25/0872
(Continued)

(56) References Cited

U.S. PATENT DOCUMENTS 2,379,735 A 7/1945 Meikle
4,651,889 A * 3/1987 Uranishi et al. ............. 220/86.2
(Continued)

FOREIGN PATENT DOCUMENTS

DE 3829948 A1 3/1990
DE 19511073 A1 9/1996
(Continued)

OTHER PUBLICATIONS

EP0857602.pdf.*
(Continued)

*Primary Examiner* — J. Gregory Pickett
*Assistant Examiner* — Allan Stevens
(74) *Attorney, Agent, or Firm* — Grossman, Tucker, Perreault & Pfleger, PLLC

(57) ABSTRACT

The invention relates to a filler neck (1) for a fuel tank of a motor vehicle having at least one tubular section (3) provided in the region of the filler inlet (2) in order to receive the outlet pipe of a fuel delivery nozzle (5), and a flame barrier (4) which is provided in the tubular section (3) and surrounds the outlet pipe of the fuel delivery nozzle (5) in the inserted state, wherein the flame barrier (4) includes at least two segments (6) which are mounted resiliently in the radial direction of the tubular section (3), the diameter of the opening (7) in the flame barrier (4) for the outlet pipe of the fuel delivery nozzle (5) being smaller in the prestressed state of the segments (6) than the diameter of the outlet pipe of the fuel delivery nozzle (5).

14 Claims, 3 Drawing Sheets

Figure 1:
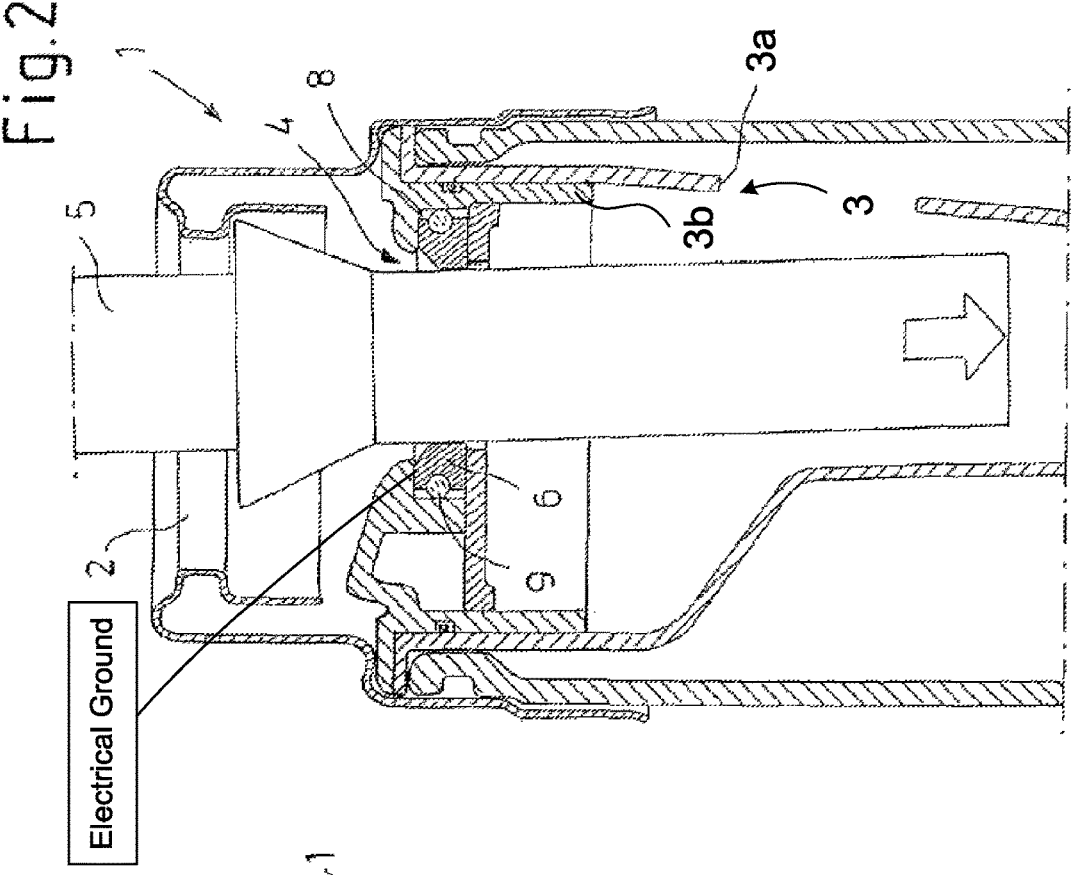

(58) Field of Classification Search
USPC ... 220/721, 746, 86.1–86.4, 88.1, 88.2, 720, 220/722, 45; 141/350
See application file for complete search history.

(56) References Cited

U.S. PATENT DOCUMENTS

| | | | |
|---|---|---|---|
| 5,027,868 A * | 7/1991 | Morris et al. | 141/59 |
| 5,246,130 A | 9/1993 | Mondt et al. | |
| 8,251,109 B2 * | 8/2012 | Gebert et al. | 141/286 |
| 8,490,661 B1 * | 7/2013 | Leipold et al. | 141/312 |
| 2006/0032552 A1 | 2/2006 | Hedevang | |
| 2008/0164255 A1 | 7/2008 | Dufays et al. | |
| 2010/0006178 A1 * | 1/2010 | Muth et al. | 141/350 |

FOREIGN PATENT DOCUMENTS

| | | |
|---|---|---|
| DE | 19533306 C1 | 12/1996 |
| DE | 202005012256 U1 | 1/2007 |
| DE | 102008036979 B3 | 4/2010 |
| EP | 0248673 B1 | 10/1990 |
| EP | 0857602 A1 * | 8/1998 |
| EP | 0857602 A1 | 8/1998 |
| EP | 1262355 A1 | 12/2002 |
| EP | 1319545 A1 | 6/2003 |
| FR | 2927024 A1 | 8/2009 |
| JP | S60199724 A | 10/1985 |

OTHER PUBLICATIONS

EP0857602_drawings.pdf.*
PCT International Search Report and Written Opinion dated Jan. 24, 2012, received in corresponding PCT Application No. PCT/EP2011/004330, 8 pgs.
PCT International Preliminary Report On Patentability dated Dec. 14, 2012, received in corresponding PCT Application No. PCT/EP2011/004330, 6 pgs.
English translation of Korean Office Action dated Apr. 29, 2014, received in related Korean Application No. 2013-7006765, 3 pgs.

* cited by examiner

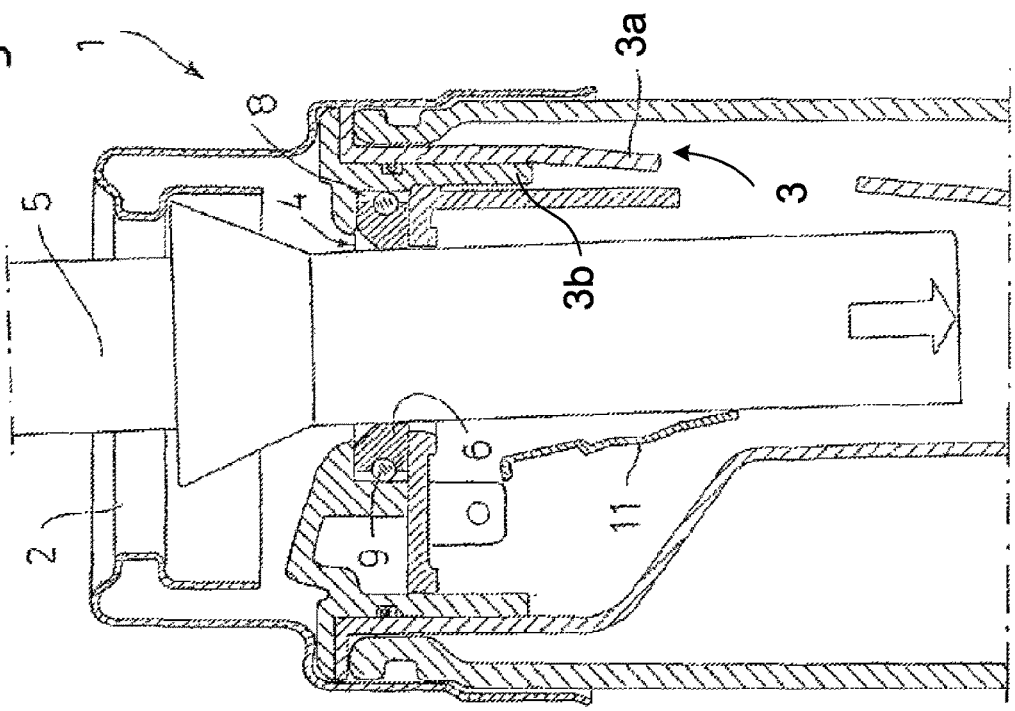
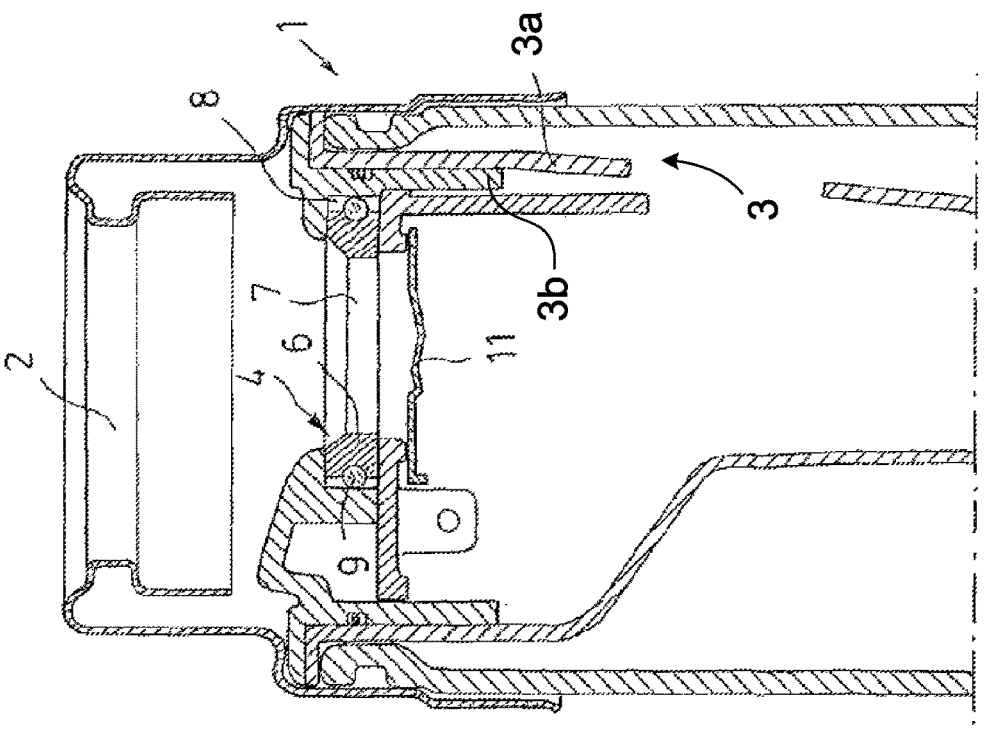

FILLER NECK FOR A FUEL TANK OF A MOTOR VEHICLE

The invention relates to a filler neck for a fuel tank of a motor vehicle having at least one tubular section provided in the region of the filler inlet in order to receive the outlet pipe of a fuel delivery nozzle, and a flame barrier which is provided in the tubular section and surrounds the outlet pipe of the fuel delivery nozzle in the inserted state.

It is fundamentally desirable to seal the filler neck of the fuel tank of a motor vehicle in relation to the outlet pipe of the fuel delivery nozzle when refueling the motor vehicle. This is intended to prevent spit-back of the fuel when shutting off the delivery nozzle on reaching the maximum filling level in the fuel tank. In addition, limited angular variations of the outlet pipe of the filler nozzle or of the delivery nozzle also have to be possible. For this purpose, the documents EP 0 248 673 B1 or DE 38 29 948 A1 disclose the provision of seals made of rubber-elastic material, which tightly enclose the inserted outlet pipe of the fuel delivery nozzle. Said seals have the disadvantage of being subject to a certain degree of wear, and therefore the efficiency thereof deteriorates relatively rapidly.

DE 195 33 306 41, for example, discloses the provision of an annular seal in the form of a brush seal with bristles directed radially inward. Said brush seal has the advantage of being relatively independent of tolerances and also being unsusceptible to wear. Any spraying out of the fuel when refueling is reliably prevented. In order to obtain any requisite high degree of gas-tightness, however, a corresponding dense arrangement of the bristles is necessary, thereby making the brush seal relatively expensive and elaborate.

Modern fuels containing ethanol, in particular, have a lower vapor pressure than conventional fuels, and therefore there is the risk, particularly when refueling with fuels containing ethanol, of inflammable volatile fuel vapor mixtures forming in the region of the filler inlet of the motor vehicle and in the expansion volume of the fuel tank when refueling. The filler neck of the fuel tank should therefore be designed for sealing in respect of the outlet pipe of the fuel delivery nozzle in such a way that flashback into the fuel tank is reliably prevented.

A filler neck of the type mentioned at the beginning is known, for example, from DE 195 11 073 A1. An insert is provided there in the filler neck, the insert forming a constriction of the filler neck and being provided circumferentially with window-like apertures as gas-removing regions, the apertures each being closed by what is referred to as a flashback safety grille. However, the reducing insert described in DE 195 11 073 A1 serves primarily to improve the efficiency during the recycling of gas and the refueling safety during the emission-free refueling using a gas recycling system. The geometry of the reducing insert is selected accordingly.

Means for preventing flashback when refueling are also described, for example, in U.S. Pat. No. 2,379,735 and U.S. Pat. No. 5,246,130.

DE 10 2008 036 979 furthermore discloses a filler neck which has a spiral ring insert which forms a multiplicity of gas passage gaps which extend in the longitudinal direction of the filler neck, wherein the gap size is selected in such a way that flashback is prevented. A disadvantage of such an insert in the filler neck is the increased amount of space required.

U.S. Pat. No. 4,651,889 discloses a fuel tank comprising a fuel inlet pipe and a cap detachably attached to the fuel inlet of the fuel inlet pipe. The fuel inlet pipe comprises a hollow cylindrical nozzle guide fixed to the inner wall of the fuel inlet port. The fuel nozzle guide includes a seal member which comprises three segments each having the same shape. Each of the segments has projections at the opposite ends thereof, and the projections of each segment overlap the projection of each adjacent segment, so that the segments sealing engage the fuel filler nozzle. This sealing element is however not to be considered a flame barrier.

Document DE 20 2005 012 256 U1 discloses a mechanically operating incorrect refueling device for a filler tube of a tank which has a receiving element, which can be pressed apart radially from its interior space at least on opposite wall areas, and a flap, which is arranged on the output side of the receiving element, covering the receiving element in locking fashion in the resting state. The flap is being unlocked and can be opened under pressure when the receiving element is pressed apart.

Another incorrect refueling device/device for preventing incorrect refueling or a nozzle inhibitor is disclosed in US 2006/0032552 A1.

The invention is therefore based on the object of providing a filler neck of the type mentioned at the beginning, with which flashback into the fuel tank is reliably prevented and which can in particular be realized with relatively little output and which requires little space.

The object is achieved by a filler neck according to claim 1, advantageous embodiments may be derived from the depending claims.

Since the at least two segments of the flame barrier are mounted resiliently in the radial direction of the tubular section, and the diameter of the opening in the flame barrier is smaller than the diameter of the outlet pipe of the fuel delivery nozzle, the segments are pushed apart in the radial direction by insertion of the outlet pipe of the fuel delivery nozzle, and therefore the outlet pipe of the fuel delivery nozzle projects through the flame barrier into the tubular section. The resilient mounting causes the segments of the flame barrier to bear tightly against the outlet pipe of the fuel delivery nozzle, thus substantially avoiding an inflammable fuel vapor air mixture from emerging, and preventing flashback into the tank.

The number of segments of the flame barrier can vary; the larger the number, the better the adaptation of the individual segments to the outlet pipe of the fuel delivery nozzle is.

According to a preferred variant of the invention, the flame barrier is at least partially arranged in a radial bulge of the tubular section. The bulge facilities the sealing between the flame barrier and the tubular section and simplifies the installation of the flame barrier in the tubular section.

According to a further variant of the invention, the flame barrier comprises a spring ring which is arranged between the tubular section and the segments of the flame barrier. The spring ring permits the resilient mounting in the radial direction of the tubular section of the segments in a simple manner. The spring ring expediently consists of spring steel or elastomer, the spring steel in particular having a high degree of rigidity.

The flame barrier is expediently configured with a diameter of between 20 mm and 25 mm and preferably of between 20.5 mm and 22 mm, in order to receive outlet pipes of fuel delivery nozzles.

According to a further variant of the invention, the distance in the radial direction between two segments in the inserted state of the outlet pipe of the fuel delivery nozzle is smaller than 2 mm, preferably smaller than 1.2 mm and furthermore preferably smaller than 0.9 mm. The effect achieved by the small distance in the radial direction between two segments is that a flame outside the fuel tank cannot flash through the gap between two segments into the fuel tank.

The segments are electrically conductive and are connected electrically to an electric ground. Prior to the refueling of the fuel tank, the outlet pipe of the fuel delivery nozzle is inserted into the tubular section. In the process, the outlet pipe pushes the segments of the flame barrier outward in the radial direction. Owing to the fact that the segments are electrically conductive and are connected in an electrically conducting manner to an electric ground, it is ensured that a static charge is dissipated prior to the refueling operation, and therefore, for example, igniting of a fuel vapor air mixture by the spark which is produced when discharging a static charge is prevented.

According to a preferred variant of the invention, the segments at least partially consist of plastic and preferably predominantly consist of plastic. The advantages of plastic are the high degree of hardness and the high degree of toughness. The segments expediently consist of conductive polyoxymethylene (POM) or of glass-fiber-reinforced polyamide (PA).

According to a further variant of the invention, the segments and/or the spring ring of the flame barrier are designed to be exchangeable retrospectively. This has the advantage that the parts of the flame barrier can be exchanged retrospectively, for example in the event of damage.

According to a preferred variant of the invention, the segments are interlaced so as to be movable in the radial direction. Interlacing of the individual segments has the advantage that the sealing between the fuel tank interior and the surroundings of the fuel tank is improved since the interlacing prevents production of continuous gaps between the individual segments of the flame barrier when the outlet pipe of the fuel delivery nozzle is inserted into the tubular section of the fuel tank.

According to an expedient variant of the invention, the flame barrier comprises four segments.

According to a further variant of the invention, a flap is furthermore provided within the tubular section of the filler neck, said flap closing the tubular section and being opened upon insertion of the outlet pipe of the fuel delivery nozzle. The flap prevents objects, in particular burning objects, from being able to pass into the interior of the fuel tank.

According to a preferred variant of the invention, the flap is arranged downstream of the flame barrier in the insertion direction of the outlet pipe of the fuel delivery nozzle. First of all, the outlet pipe of the fuel delivery nozzle is therefore sealed off from the interior of the fuel tank by means of the flame barrier and, subsequently, a flap to the interior of the fuel tank, the flap up to this point fulfilling a sealing function, is opened.

Figure 2:
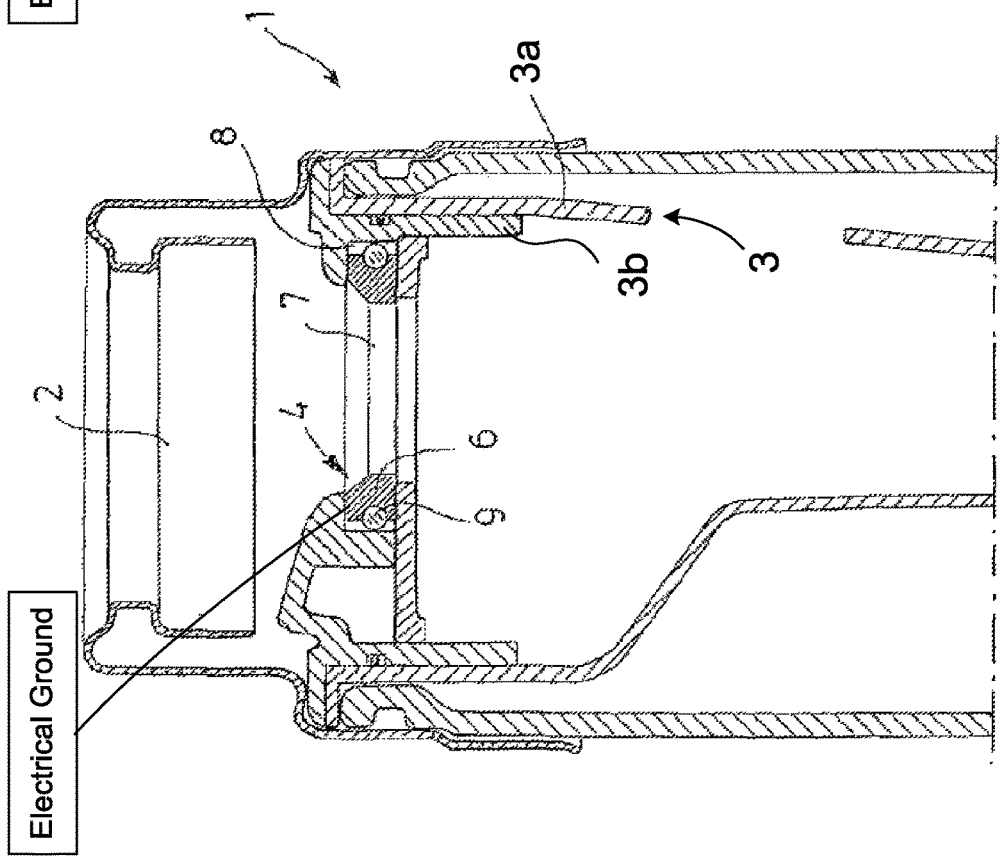
Figure 5:
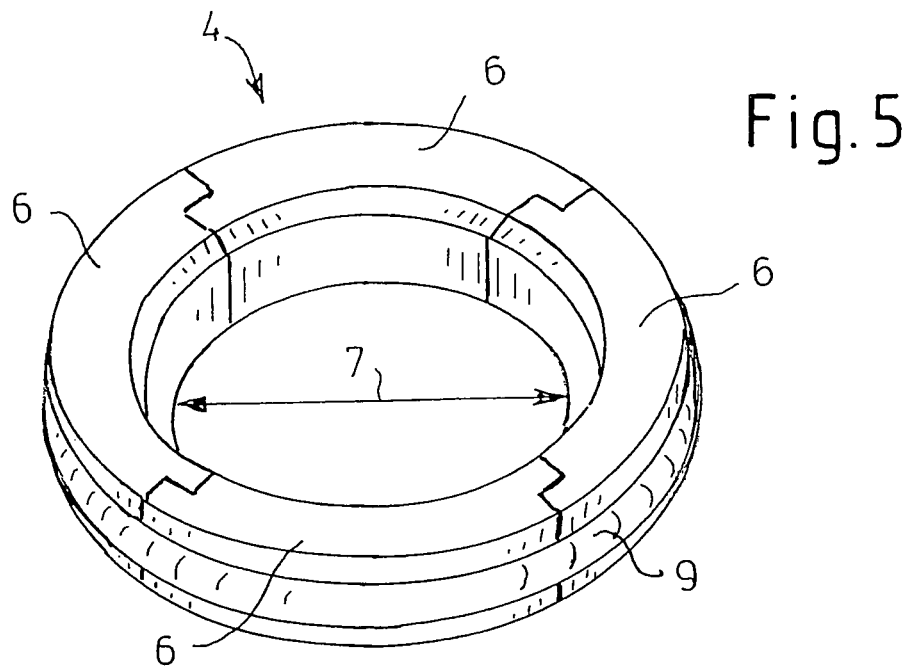
Figure 6:
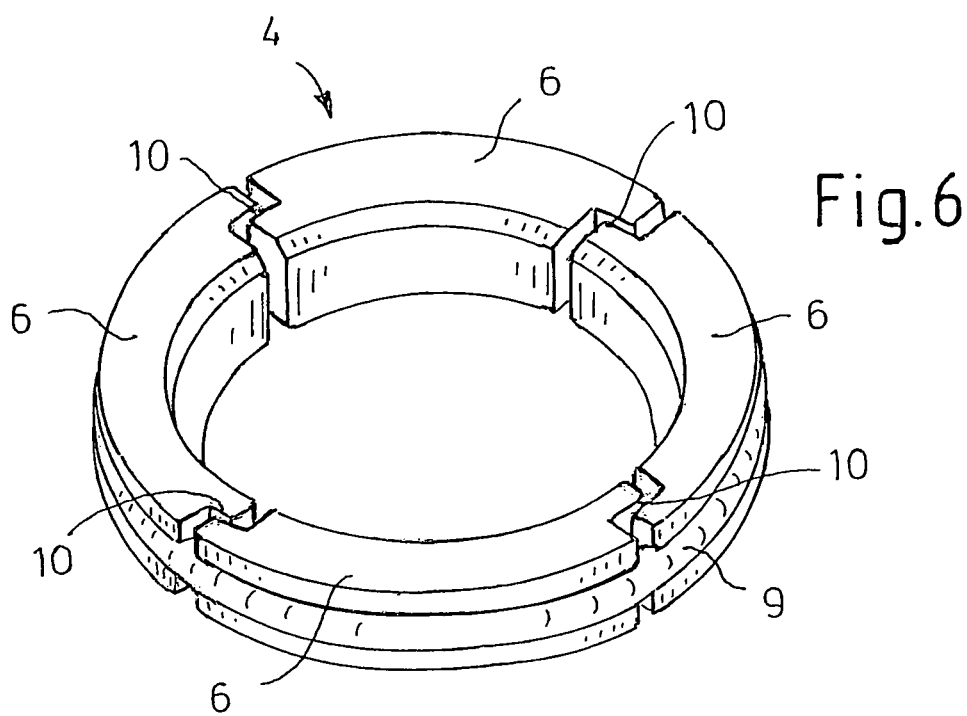

The invention is explained in more detail below with reference to exemplary embodiments which are illustrated in figures, in which:

FIG. 1 shows a sectional view of a filler neck for a fuel tank according to one embodiment of the invention, FIG. 2 shows a sectional view of the filler neck from FIG. 1 with an inserted outlet pipe of a fuel delivery nozzle, FIG. 3 shows a sectional view of a filler neck for a fuel tank according to a second embodiment of the invention, FIG. 4 shows a sectional view of the filler neck according to FIG. 3 with an inserted outlet pipe of a fuel delivery nozzle, FIG. 5 shows a detailed view of a flame barrier according to an exemplary embodiment of the filler neck according to the invention, and FIG. 6 shows a detailed view of the flame barrier from FIG. 5 when the outlet pipe of a fuel delivery nozzle is inserted into the flame barrier.

FIG. 1 illustrates a sectional view of a filler neck 1 according to the invention for a fuel tank of a motor vehicle. The filler neck 1 has at least one tubular section 3 (formed by outer tubular section 3a and inner tubular section 3b) provided in the region of the filler inlet 2 for receiving the outlet pipe of a fuel delivery nozzle 5, the tubular section 3, in the exemplary embodiment illustrated, having a reduced diameter in comparison to the filler neck. A flame barrier 4 is provided in the tubular section 3, the flame barrier surrounding the outlet pipe of the fuel delivery nozzle 5 in the inserted state. The flame barrier 4 comprises at least two segments 6 which are mounted resiliently in the radial direction of the tubular section 3. The diameter of the opening 7 in the flame barrier 4 for the outlet pipe of a fuel delivery nozzle 5 is smaller in the prestressed state of the segments 6 than the diameter of the outlet pipe of the fuel delivery nozzle 5. The effect achieved by this is that the segments 6 are placed against the contour of the outlet pipe of the fuel delivery nozzle 5 during the refueling of the fuel tank, and therefore the fuel tank interior is sealed off from the surroundings of the fuel tank.

The flame barrier 4 is arranged in a radial bulge 8 of the tubular section 3, thus increasing the tightness between tubular section 3 and segments 6 of the flame barrier 4.

The flame barrier 4 furthermore comprises a spring ring 9 which is arranged between the tubular section 3 and the segments 6 of the flame barrier 4. In the exemplary embodiment illustrated, the spring ring 9 is arranged in the radial bulge 8 of the tubular section 3.

The spring ring 9 illustrated consists of spring steel which has a high degree of strength.

The flame barrier 4 illustrated in FIG. 1 is configured with a diameter of between 20.5 mm and 22 mm in order to receive outlet pipes of fuel delivery nozzles 5.

The distance in the radial direction between two segments 6 in the inserted state of the outlet pipe of the fuel delivery nozzle 5 is smaller than 0.9 mm, thus preventing any flashback into the interior of the fuel tank.

The segments 6 of the flame barrier 4 consist of plastic and are electrically conductive and are connected in an electrically conducting manner to an electric ground. In the exemplary embodiment illustrated, the segments 6 of the flame barrier 4 consist of conductive polyoxymethylene.

The segments 6 and the spring ring 9 of the flame barrier 4 are designed in such a manner that, after being fitted, they can be removed again from the bulge 8, and therefore defective parts of the flame barrier 4 can be exchanged retrospectively.

FIG. 2 shows the filler neck from FIG. 1 with an inserted outlet pipe of the fuel delivery nozzle 5. By means of the insertion of the outlet pipe of the fuel delivery nozzle 5, the segments 6 of the flame barrier 4 have been pushed outward in the radial direction of the tubular section 3, thus widening the spring ring 9. By means of the spring force of the spring ring 9, the segments 6 are placed against the contour of the outlet pipe of the fuel delivery nozzle 5.

The distance in the radial direction between two segments 6 of the flame barrier 4 in the inserted state of the outlet pipe of the fuel delivery nozzle 5 is smaller than 0.9 mm, thus preventing flashback into the interior of the fuel tank.

The exemplary embodiment according to FIG. 3 differs from the exemplary embodiment according to FIG. 1 by the fact that a flap 11 is furthermore provided within the tubular section 3, said flap closing the tubular section 3 and being opened upon insertion of the outlet pipe of the fuel delivery nozzle 5. The flap 11 is arranged downstream of the flame barrier 4 in the insertion direction of the outlet pipe of the fuel delivery nozzle 5. The flap 11 prevents burning or glowing objects from penetrating into the interior of the fuel tank.

When the outlet pipe of the fuel delivery nozzle 5 is inserted, the outlet pipe is first of all sealed off from the surroundings of the fuel tank by means of the flame barrier 4. The flap 11 is subsequently opened by further insertion of the outlet pipe of the fuel delivery nozzle 5 into the tubular section 3.

FIG. 4 illustrates the filler neck according to FIG. 3 with an inserted outlet pipe of the fuel delivery nozzle 5.

FIG. 5 illustrates a detailed view of a flame barrier 4. The flame barrier 4 consists of four segments 6 which provide a circular opening for the outlet pipe of a fuel delivery nozzle 5. The segments 6 are prestressed inward in the radial direction by a spring ring 9. The diameter of the opening 7 in the flame barrier 4 for the outlet pipe of the fuel delivery nozzle 5 is smaller in the prestressed state of the segments 6 than the diameter of the outlet pipe of the fuel delivery nozzle 5.

FIG. 6 illustrates the flame barrier 4 according to FIG. 5 after the insertion of an outlet pipe of a fuel delivery nozzle 5. By means of the outlet pipe of the fuel delivery nozzle 5, the four segments 6 have been pushed radially outward counter to the spring force of the spring ring 9 and now surround the contour of the outlet pipe of the fuel delivery nozzle 5. Small gaps which are smaller than 0.9 mm are formed between the individual segments 6 of the flame barrier 4 in order to prevent flashback. The segments 6 are interlaced 10 so as to be movable in the radial direction, for example by means of steps of complementary design or by a tongue and groove system.

LIST OF REFERENCE NUMBERS 1 filler neck
2 filler inlet
3 tubular section
4 flame barrier
5 fuel delivery nozzle
6 segments
7 opening in the flame barrier
8 radial bulge
9 spring ring
10 interlacing of the segments
11 flap

What is claimed is:

1. A filler neck for a fuel tank of a motor vehicle comprising:
   at least one tubular section provided in a region of a filler inlet to receive an outlet pipe of a fuel delivery nozzle, wherein the outlet pipe has a diameter, and
   a flame barrier provided in the tubular section, wherein the flame barrier is arranged to surround the outlet pipe of the fuel delivery nozzle when the fuel delivery nozzle is within the tubular section,
   wherein the flame barrier comprises at least two segments which are moveable in the tubular section, the at least two segments movable from a first state occupied before insertion of the fuel delivery nozzle into the tubular section to a second state occupied after insertion of the fuel delivery nozzle into the tubular section,
   wherein, in the first state of the at least two segments, a diameter of an opening in the flame barrier for the outlet pipe is arranged smaller in a prestressed state of the segments than the diameter of the outlet pipe of the fuel delivery nozzle,
   wherein, in the second state of the at least two segments, gaps are formed between the at least two segments such that a distance of the gaps between the at least two segments is smaller than 2 mm,
   wherein, in the second state of the at least two segments, the distance of the gaps between the at least two segments is such that fuel vapor from within the tank passes through the gaps while preventing a flashback outside the tank from passing through the gaps, and
   wherein the at least two segments are electrically conductive and are connected in an electrically conducting manner to an electric ground.

2. The filler neck as claimed in claim 1, characterized in that the flame barrier is at least partially arranged in a radial bulge of the tubular section.

3. The filler neck as claimed in claim 1, characterized in that the flame barrier comprises a spring ring which is arranged between the tubular section and the segments of the flame barrier.

4. The filler neck as claimed in claim 3, characterized in that the spring ring is formed of spring steel or elastomer.

5. The filler neck as claimed in claim 1, characterized in that, in the first state of the at least two segments, the diameter of the opening in the flame barrier for the outlet pipe is between 20 mm and 25 mm.

6. The filler neck as claimed in claim 1, characterized in that the segments are at least partially formed of plastic.

7. The filler neck as claimed in claim 6, characterized in that the plastic comprises electrically conductive polyoxymethylene or glass-fiber-reinforced polyamide.

8. The filler neck as claimed in claim 1, characterized in that at least one of the segments is exchangeable retrospectively with another segment.

9. The filler neck as claimed in claim 1, characterized in that the segments are interlaced.

10. The filler neck as claimed in claim 1, characterized in that the flame barrier comprises at least four segments.

11. The filler neck as claimed in claim 1, characterized in that a flap is furthermore provided within the tubular section, said flap closing the tubular section and being opened upon insertion of the outlet pipe of the fuel delivery nozzle.

12. The filler neck as claimed in claim 11, characterized in that the flap is arranged downstream of the flame barrier in an insertion direction of the outlet pipe of the fuel delivery nozzle.

13. The filler neck as claimed in claim 1, characterized in that the distance of the gaps between the at least two segments is smaller than 1.2 mm.

14. The filler neck as claimed in claim 1, characterized in that the distance of the gaps between the at least two segments is smaller than 0.9 mm.

* * * * *